April 17, 1951     R. L. F. McDONALD     2,548,988

PEDAL LIFT FOR VELOCIPEDES

Filed Jan. 5, 1950

INVENTOR.
ROBERT L. F. McDONALD
BY
ATTORNEY

Patented Apr. 17, 1951

2,548,988

UNITED STATES PATENT OFFICE 2,548,988

PEDAL LIFT FOR VELOCIPEDES

Robert L. F. McDonald, Rochester, N. Y.

Application January 5, 1950, Serial No. 136,901

3 Claims. (Cl. 74—594.4)

The present invention relates to pedal lifts for velocipedes generally, and particularly to pedal lifts for children's bicycles and tricycles.

The conventional pedal for a bicycle or velocipede includes a pedal shaft or spindle, spaced end plates, rods connecting the end plates, and rubber treads mounted on those rods. In junior sizes of velocipedes, particularly, it is often difficult to find a bicycle or tricycle having a pedal reach exactly suited to the child who is to ride the velocipede. The reach may be regulated to some extent by adjusting the seat post, but in many instances, even when the seat post is adjusted to its lowest position, the pedal reach is still not shortened sufficiently for the rider. As a result the purchaser must choose the next smaller size of velocipede with a result that the child outgrows it in a very short time and it is no longer useful.

It has been proposed to enlarge the size of the pedals by substituting for the conventional pedal rubbers, pedal blocks of increased thickness. These are expensive, however, and, moreover, form a permanent attachment to the pedals so that it is impossible to increase the pedal reach as the child grows older without adjusting the seat post or removing the pedals and substituting conventional pedals therefor.

One object of the present invention is to provide a removable pedal lift which can be detachably secured to a conventional bicycle or tricycle pedal to provide the pedal reach when needed, and which may be removed quickly and easily from the pedals when the child has grown sufficiently to use the pedals without any lift.

Another object of the invention is to provide a quickly attachable and detachable pedal lift which is simple in construction and cheap in price.

A further object of the invention is to provide a pedal lift which can be quickly attached to or removed from a pedal without the use of any special tools, but simply by hand.

A further object of the invention is to provide a pedal lift for the pedals of velocipedes which will securely hold itself in place, which needs no adjustment, and which requires no special attaching means.

Other objects of the invention will be apparent hereinafter from the specification and from the recital of the appended claims.

Figure 1:
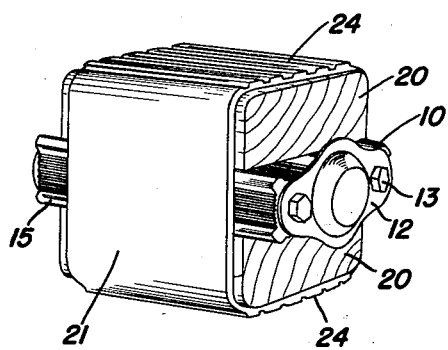
Fig. 1 is a perspective view showing a conventional velocipede pedal fitted with a pedal lift made according to one embodiment of this invention.

Referring now to the drawing by numerals of reference, 10 denotes a conventional velocipede pedal. This comprises the pedal shaft 11, the two axially spaced end plates 12, the rods 13 which secure the end plates together, the tube 14 in which the pedal shaft is enclosed, and the rubber treads 15 which are mounted upon the rods 13.

My pedal lift comprises a pair of blocks 20, and a tubular rubber tread and retainer 21. The two blocks 20 are preferably made of hard wood and identical. They are positioned parallel to one another and are encircled by the tubular shaped rubber elastic retainer 21 which is fastened to each block preferably only by a single staple 22. The retainer 21 is preferably provided on its outside surface at diametrically opposed portions with molded rubber treads 24.

Figure 3:
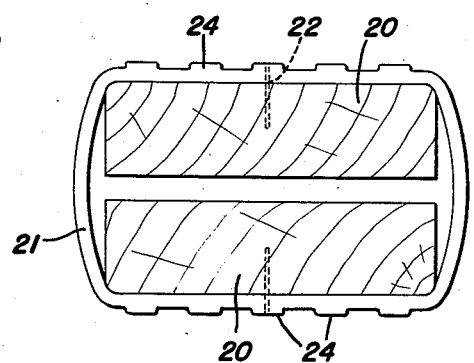
Fig. 3 is an end elevation showing the pedal lift alone.
Figure 2:
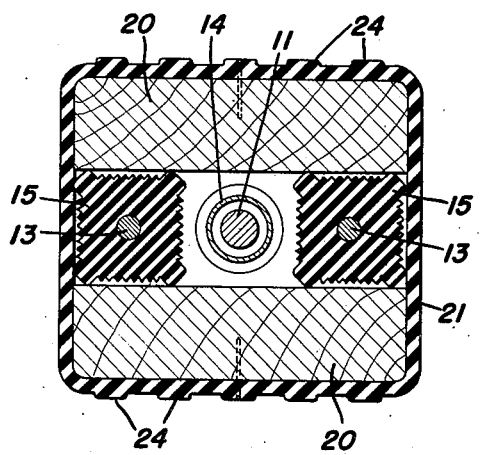
Fig. 2 is a transverse vertical sectional view through the pedal and pedal lift.

Fig. 3 shows the pedal lift in normal, out-of-use position. The rubber of the retainer 21 is of sufficient thickness to make it self-supporting. To apply the pedal lift to a pedal a person grasps the two blocks 20, and stretches the rubber retainer 21 enough to slip the blocks over the pedal treads 15. When the blocks are pulled apart the lift can be snapped on the pedals firmly. The resiliency of the rubber is such as to firmly hold the lift on the pedal with the blocks 20 in proper position with respect to each other and with respect to the pedal and under constant tension. By fastening the retainer 21 to the blocks 20 by single staples 22 the cost of manufacture is kept to a minimum but more important the full stretch of the rubber retainer 21 for its entire circumference is permitted, and the stretch is not restricted as would be the case were the rubber to be fastened to the blocks over a larger block area.

The retainer 21 may be so designed as to give proper tension on large or small pedals without need of adjustment and without any other means of attachment to the pedals than the rubber tension itself. The durable heavy treads 24 which are molded into the rubber prevent the feet of the user of the velocipede from slipping as he propels the vehicle.

Figure 4:
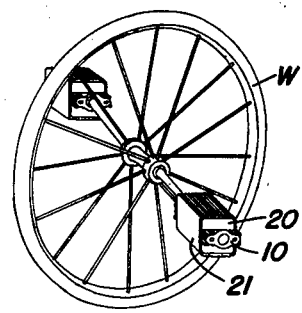
Fig. 4 is a perspective view of the drive wheel of a tricycle equipped with pedal lifts made according to the present invention.

Fig. 4 shows a conventional tricycle drive wheel W equipped with pedal lifts made according to this invention.

Because of the ease of adjustment of the reach of the pedal provided by this pedal lift the smallest child may now ride a tricycle. With this pedal lift, moreover, children may graduate to the bicycle age quicker. The pedal lift eliminates strain from undue reaching. It fits any size pedal and it fits either bicycle or tricycle to the child.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A pedal lift for velocipede pedals comprising a pair of blocks, and a tubular elastic band to which the blocks are secured, said band being expansible to permit it to be slipped over a pedal so as to secure the blocks on or to remove them from the pedal, and said band being provided on its outside with a foot-engageable tread portion.

2. A pedal lift for velocipedes comprising a pair of blocks, and a tubular elastic band surrounding the two blocks, said blocks being secured in parallelism to the inside of said band, and said band being expansible to permit the blocks to be slipped over a pedal and seated against opposite sides of the pedal and be held thereagainst by the elasticity of the band, and said band being provided on its outside with a foot-engageable tread portion.

3. A pedal lift for velocipedes comprising a pair of identical blocks, a tubular elastic band, and means for fastening each block to the inside of the band at a single point, said blocks being secured to the band in parallelism, said band being expansible to permit the blocks to be slipped over a pedal and seated against opposite sides of the pedal, the resiliency of the band operating thereupon to hold the blocks firmly in position, and said band being provided on its outside with two ribbed tread portions which are parallel when the lift is in position on the pedal.

ROBERT L. F. McDONALD.

REFERENCES CITED

The following references are of record in the file of this patent:

FOREIGN PATENTS

| Number | Country | Date |
|--------|---------|------|
| 590,360 | France | Oct. 4, 1924 |

OTHER REFERENCES

Sears, Roebuck & Co. Catalog, 1942–43 edition, page 896.